March 24, 1931.  W. A. CHRYST  1,797,755
SHOCK ABSORBER
Filed Nov. 14, 1928
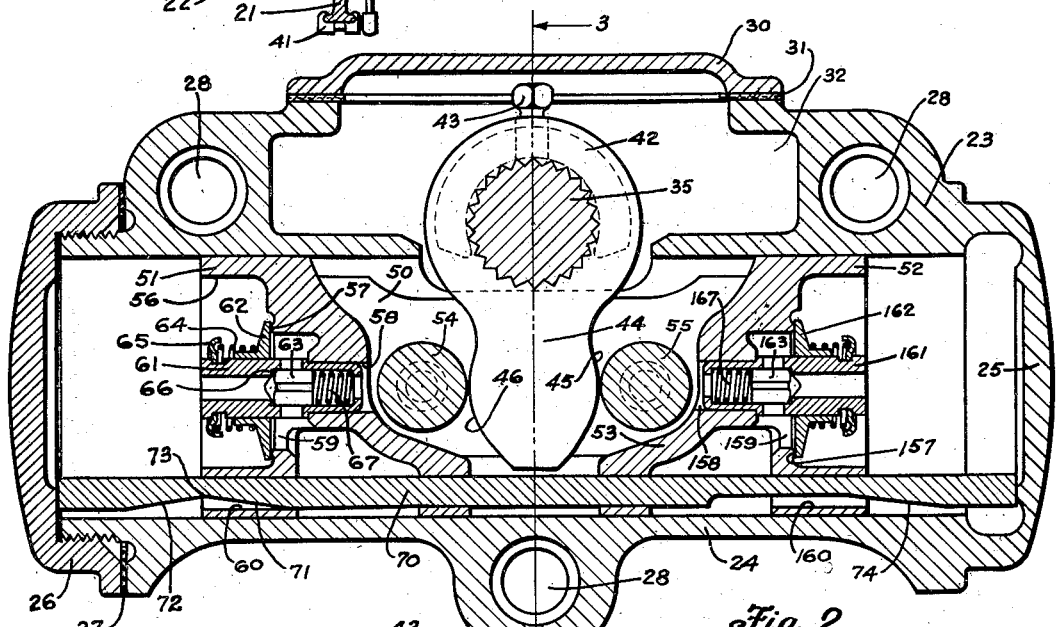
Fig. 1.
Fig. 2.
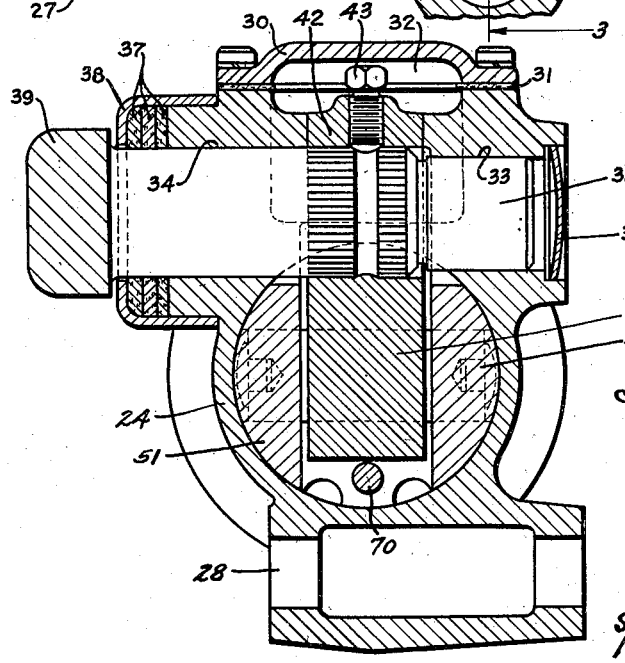
Fig. 3.
Inventor
William A. Chryst
Spencer, Hardman & Fehr
His Attorneys Patented Mar. 24, 1931

1,797,755

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed November 14, 1928. Serial No. 319,372.

This invention relates to improvements in shock absorbers for cushioning the movement of two relatively movable members, for example the frame and axle of a vehicle.

It is among the objects of the present invention to provide a shock absorber of simple structure and design, capable of resisting both the approaching and separating movements of the frame and axle of the vehicle for dissipating road shocks and substantially preventing the transmission of such shocks to the vehicle frame.

Further objects and advantages of the present invention will be apparent from the following description, reference being had to the accompanying drawings, wherein a preferred embodiment of one form of the present invention is clearly shown.

In the drawings:

Fig. 1 illustrates the front portion of the frame of an automotive vehicle supported by springs upon the usual axle, the shock absorber embodying the present invention being shown applied thereto.

Fig. 2 is a cross sectional view taken longitudinally through the shock absorber.

Fig. 3 is a transverse sectional view taken along the line 3—3 of Fig. 2, certain parts being shown in elevation for the sake of clearness.

Referring to the drawings, the numeral 20 designates the frame of the vehicle which is supported upon the vehicle axle 21 by a series of springs 22, only one of which is shown.

The shock absorber comprises a casing 23 presenting a cylinder 24, closed at one end by the end wall 25 and at the other end by a cap member 26 screw-threaded upon this end of the cylinder 24. A gasket 27 is interposed between the cap 26 and the casing 23 substantially to prevent fluid leaks. The casing has a plurality of screw-threaded holes 28 for receiving bolts 29 by which the casing is secured to the frame 20. A cap 30, provided with a gasket 31, forms a fluid-tight cover for the fluid chamber 32 provided in the casing 23, said fluid chamber being in communication with the cylinder 24.

Fig. 3 in particular shows the casing 23 providing oppositely disposed and aligned bearings 33 and 34 in which is journalled the rocker shaft 35. The open end of bearing portion 33 is provided with a plug 36 which prevents fluid leaks at this point. The fluid from the fluid chamber 32 is substantially prevented from leaking through bearing portion 34 by a plurality of packing glands 37, urged into sealing engagement with the rocker shaft 35 by a packing gland 38, which fits tightly about an annular lug on the casing portion presenting bearing 34. The shaft 35 extends out of the casing and has formed thereon the operating arm 39, the free end of which is swivelly connected to one end of a connecting rod 40, the other end of said connecting rod being swivelly connected to the bracket 41 anchored to the vehicle axle 21 as shown in Fig. 1.

Within the casing 23 the rocker shaft 35 has the rocker arm 42 attached thereto, knurls being provided on both the shaft 35 and rocker arm 42 so that no rotating motion between said elements may obtain. A set screw 43 is provided in the rocker arm 42 and extends into an annular groove 44 in the rocker shaft 35 whereby relative endwise motion between the rocker shaft and rocker arm, 35 and 42 respectively, is substantially eliminated. The rocker arm 42 has an extending portion 44 presenting cam faces 45 and 46, the function of which will be described hereinafter.

Within the cylinder there is provided a piston 50 having aligned and oppositely disposed head portions 51 and 52 connected together by an intermediate web portion 53, which presents a fluid chamber between the piston head portions 51 and 52, said chamber being in communication with the fluid chamber 32. Two rollers 54 and 55 are supported by the web portion 53, transversely of the piston and in proper spaced relation, so that, as shown in Fig. 2, the extending arm portion 44 of the rocker arm 42 extends between said rollers 54 and 55, the cam face 46 being in engagement with the roller 54, while the cam face 45 is in engagement with the roller 55.

Hereinafter the piston head portion 51 will be referred to as the "snubber" piston, while the piston head portion 52 will be referred to as the "bumper" piston. Inasmuch as both piston head portions are constructed alike, only one of them will be described detailedly, reference being had to the "snubber" piston 51.

By referring to Fig. 2 it will be seen that the "snubber" piston is provided at its outer end with a central bore 56 presenting an annular ledge 57 in the bottom thereof which forms a valve seat. The piston head 51 has a plurality of passages therethrough for the transfer of fluid from one side of the piston head to the other. These passages are designated by the numerals 58, 59 and 60. The annular valve seat 57 is substantially coaxial of the passage 58, while passage 59 is centrally offset, but still within the area of the annular valve seat member 57. The piston head 51 is provided with a unitary valve structure comprising a tubular member 61, one end of which fits tightly into the passage 58, the other end extending into the bored out portion 56. This tubular member 61 supports two valves 62 and 63, yieldably urged in opposite directions. Valve 62 is slidably supported upon the tubular member 61 within the bored-out space 56 of the piston head 51, said valve 62 being yieldably, normally held in engagement with the annular valve seat 57 by a spring 64 interposed between the valve 62 and a retaining collar 65 secured in an annular groove in the tubular member 61 adjacent its outer end. Valve 62 seated upon the annular valve seat 57 yieldably holds closed the passage 59. Valve 63 is slidably supported within the tubular member 61 and is normally, yieldably maintained upon the valve seat 66, provided inside the tubular member 61, by a spring 67, interposed between the valve 63 and an inwardly extending flange formed at the inner end of the tubular member 61. Valve 63 thus normally holds the passage 58 closed inasmuch as the valve closes the tubular member 61 and the tubular member fits tightly within the passage 58.

The "bumper" piston head 52 is also provided with passages 158, 159 and 160 similar to the corresponding passages of the "snubber" piston 51.

Within the cylinder there is provided a metering pin 70, the ends of which engage with the ends of the cylinder 24 to hold the metering pin in proper position endwise, said metering pin extending through the passages 60 and 160 of the "snubber" and "bumper" pistons 51 and 52 respectively. Adjacent the passage 60 of the "snubber" piston 51, the metering pin is provided with a recess comprising two sloping surfaces 71 and 72 which converge at the point 73, said converging point being substantially in alignment with the outer edge of the piston head 51 when said piston head is substantially in intermediate normal position as shown in Fig. 2. Adjacent the passage 160 of the "bumper" piston 52 the metering pin 70 is provided with a recess having a sloping wall 74, the portion of said sloping wall most remote from the wall of passage 160 being substantially in alignment with the outer edge of the piston head portion 52 when the piston is substantially in the intermediate normal position as shown in Fig. 2. This last mentioned recess of pin 70 gradually grows shallower as it approaches the end 25 of the cylinder.

The device functions as follows:

When the wheels of the vehicle (not shown on the present drawings) strike an obstruction in the roadway, spring 22 will be flexed toward the frame 20 of the vehicle, such flexing movement of the spring by the movement of the axle 21 upwardly causing the connecting rod 40 to move the shock absorber operating arm 39 in a counter-clockwise direction, resulting in a similar counter-clockwise rotation of the rocker shaft 35 and its attached rocker arm 42. This movement of the rocker arm 42 will cause the cam face 45 to press against the roller 55 and move the piston 50 toward the right in the cylinder 24 as regards Fig. 2. As the piston 50 moves in this direction, fluid within the fluid chamber 32 and within the space between the piston heads 51 and 52 will force valve 62 of the "snubber" piston from the annular valve seat 57 against the effect of spring 64, and thus will be established a substantially free flow of fluid from the fluid chamber 32 through the passage 59 into the "snubber" compression chamber. Movement of the piston 50 toward the right within the cylinder 24 will exert pressure upon the fluid within the "bumper" compression chamber. Ordinary pressures within this "bumper" compression chamber will not move valve 163 against the effect of its spring 167 to open the passage through the tubular member 161. Substantially the only escape of the fluid within the "bumper" compression chamber under ordinary pressures is through the orifice presented between the wall of passage 160 and the recess of the metering pin 70. It is apparent that in the normal position of the piston as shown in Fig. 2 this orifice will have its greatest area, but as the piston head 52 is moved toward the end 25 of the cylinder, the passage 160 will be moved over the declining surface 74, gradually reducing the area of said orifice. Thus, as the piston moves toward the right as regards Fig. 2, the restriction to the flow of fluid through the passage 160 will gradually be increased. Gradually increasing the restriction to the flow of fluid from the "bumper" compression chamber will of course gradually increase the resistance to piston movement and consequently through the operating connections, including the rocker arm 32, rocker shaft 35, operating arm 39 and connecting rod 40, the movement of the spring and axle, 22 and 41 respectively, toward the frame 20 will gradually, increasingly be resisted.

When the force of the impact has been spent and the limit of the flexure of spring 22 has been reached, the tendency of the spring is to rebound suddenly toward its normal unflexed position, such rebound resulting in jars and jolts being transmitted to the frame of the vehicle. Return movement of the spring 22 results in the movement of the piston 50 toward the left as regards the Fig. 2, such movement resulting in the movement of the valve 162 of the "bumper" piston from the annular valve seat 157 and consequently establishing a substantially free flow of fluid from the fluid chamber 32 through the passage 159 into the "bumper" compression chamber. At the flexed position of the spring 22, the piston 50 will be somewhere to the right of the intermediate normal position, so that, in said position the outer edge of the "snubber" piston 51 will be somewhere to the right of the point 73 on metering pin 70. As the piston moves toward the left the pressure upon the fluid in the "snubber" compression chamber will cause said fluid to escape through the orifice presented by the sloping surface 71 and the wall of the passage 60, said orifice at this time being comparatively small. Movement of the piston toward the left along the sloping wall 71 of the metering pin 70 will gradually increase the orifice until the piston reaches the intermediate normal position as shown in Fig. 2. Continued movement of the piston from this intermediate normal position along the surface 72 of the metering pin 70 gradually decreases the orifice, thus, as the piston moves toward the left over the inclining and declining surfaces 71 and 72 respectively of the metering pin 70, the restriction to the flow of fluid through passage 60 will at first be decreased and then increased at a proper rate. This control of the flow of fluid through the passage 60 will cause piston 51 gradually, decreasingly to resist the return movement of spring 22 during the initial portion of its range of return travel, and then gradually, increasingly to resist said return movement of the spring gradually, increasingly. Such control substantially prevents rebounding of the spring and the resulting jars and jolts.

The valves 63 and 163 of the "snubber" and "bumper" pistons 51 and 52 respectively will not open to relieve fluid pressures until a certain excessive pressure within the respective compression chamber obtains. When such excessive pressures are reached and the passages 60 and 160 of the piston heads 51 and 52 respectively are inadequate to provide for the escape of fluid, then valves 63 and 163, depending upon the direction of movement of the piston, will open to provide an additional flow of fluid from the respective compression chamber to relieve the said chamber of the excessive pressure and thus substantially prevent breakage.

Applicant has provided in each piston head a unitary valve structure which may be assembled complete before being secured within the piston head, each unitary valve structure may be thoroughly tested and proven before being attached to its respective piston head.

Applicant's invention provides a shock absorber capable of efficiently resisting approaching and separating movements of the spring and frame of the vehicle substantially to prevent road shocks from being transmitted to the vehicle body supported on the frame, said invention producing a shock absorber which may easily be assembled with a minimum expenditure of time and labor.

While the form of embodiment of the present invention, as herein disclosed, constitutes a preferred form, it is to be understood that other forms might be adopted, all coming within the scope of the claims which follow.

What is claimed is as follows:

1. A shock absorber, comprising in combination, a casing presenting a closed end cylinder; a piston within said cylinder providing a compression chamber at the closed end of the cylinder and having a plurality of passages providing for the transfer of fluid from one side of the piston to the other, said piston presenting an annular valve seat, a unitary valve mechanism supported by the piston, comprising two valve members yieldably urged in opposite directions, one of said valve members normally engaging said annular valve seat in the piston and being adapted to establish a substantially free flow of fluid through one of the piston passages into the compression chamber in response to the movement of said piston in one direction, the other valve member being adapted to establish a restricted flow of fluid from the compression chamber through the other piston passage in response to fluid pressure within the compression chamber exceeding a predetermined value as the piston is moved in the other direction; and means for operating said piston.

2. A shock absorber, comprising in combination, a casing presenting a closed end cylinder and a fluid chamber in communication therewith; a piston within said cylinder providing a compression chamber at the closed end of the cylinder and having passages providing for the transfer of fluid from one side of the piston to the other; a unitary valve mechanism adapted to establish a free flow of fluid through one of said piston passages into the compression chamber in response to the movement of the piston in one direction, and adapted to establish a restricted flow of fluid from the compression chamber through the other piston passage when the fluid pressure within the compression chamber exceeds a predetermined value in response to the movement of the piston in the other direction; means within the cylinder, extending through a third passage in the piston, said means cooperating with the piston to establish a restricted flow of fluid from the compression chamber to the fluid chamber in response to the movement of the piston in said other direction; and means for operating the piston.

3. A shock absorber, comprising in combination, a casing presenting a closed end cylinder and a fluid chamber communicating therewith; a piston in said cylinder, having a plurality of passages providing for the transfer of fluid from one side of the piston to the other; means for reciprocating said piston; a unitary valve mechanism carried by the piston, having two oppositely operating, spring-loaded valves one of which provides for the free flow of fluid through the piston when said piston is being operated in the one direction, the other providing for a restricted flow of fluid through said piston when it is being operated in the other direction and only when the fluid pressure within the cylinder exceeds a predetermined value; a metering pin within the cylinder extending through another piston passage and adapted to establish a restricted flow of fluid through said piston as it is being operated in said other direction; and means for operating the piston.

4. A shock absorber, comprising in combination, a casing presenting a cylinder having a closed end; a piston within said cylinder and providing a compression chamber at the closed end of the cylinder, said piston having a plurality of passages providing for the transfer of fluid from one side of the piston to the other; an annular valve seat formed in said piston; a tubular member supported in one of said passages; valves slidably supported by the tubular member and yieldably urged in opposite directions normally to close the piston passages, one of said valves engaging the said annular valve seat and being adapted to provide for a free flow of fluid around the tubular member and into the compression chamber in response to the movement of the piston in one direction, the other valve being adapted to provide for a restricted flow of fluid from the compression chamber through the tubular member when the fluid pressure in the compression chamber exceeds a predetermined value in response to the movement of the piston in the other direction; and means in the casing for operating the piston.

5. A shock absorber, comprising in combination, a casing presenting a cylinder having a closed end; a piston within said cylinder and providing a compression chamber at the closed end of the cylinder, said piston having a plurality of passages providing for the transfer of fluid from one side of the piston to the other; a tubular member supported in one of said passages; valves slidably supported by the tubular member and yieldably urged in opposite directions normally to close certain of the piston passages, one of said valves being adapted to provide for a free flow of fluid around the tubular member and into the compression chamber in response to the movement of the piston in one direction, the other valve being adapted to provide for a restricted flow of fluid from the compression chamber through the tubular member when the fluid pressure in the compression chamber exceeds a predetermined value in response to the movement of the piston in the other direction; a metering pin extending through another of the piston passages and cooperating therewith to establish a restricted flow of fluid from the compression chamber while the piston is being operated in said other direction; and means in the casing for operating the piston.

6. A shock absorber, comprising in combination, a casing presenting a cylinder closed at both ends and having a fluid chamber in communication therewith; a double-headed piston within said cylinder providing a compression chamber at each end thereof, said piston having a plurality of passages through its head portions; a tubular member supported in one of the passages of each piston head portion respectively; a valve slidably supported upon each of the tubular members and yieldably urged to close one of the respective piston passages, said valves, however, providing for a free flow of fluid into one or the other compression chambers in response to the movement of the piston away from either one or the other cylinder ends respectively; a valve slidably supported within each of the tubular members and yieldably urged to close the respective members, said valves establishing a restricted flow of fluid from one or the other compression chambers respectively when the fluid pressure within said chambers exceeds a predetermined value as the piston moves toward one or the other cylinder end respectively, and a lever in the casing for operating the piston.

7. A shock absorber, comprising in combination, a casing presenting a cylinder closed at both ends and having a fluid chamber in communication therewith; a double-headed piston within said cylinder providing a compression chamber at each end thereof, said piston having a plurality of passages through its head portions; a tubular member supported in one of the passages of each piston head portion respectively; a valve slidably supported upon each of the tubular members and yieldably urged to close one of the respective piston passages, said valves, however, providing for a free flow of fluid into one or the other compression chambers in response to the movement of the piston away from either one or the other cylinder ends respectively; a valve slidably supported within each of the tubular members and yieldably urged to close the respective members, said valves establishing a restricted flow of fluid from one or the other compression chambers respectively when the fluid pressure within said chambers exceeds a predetermined value as the piston moves toward one or the other cylinder end respectively; a metering pin within the cylinder and extending through other of the passages in the piston head portions, said metering pin cooperating with said portions to establish a restricted flow of fluid from the respective compression chambers in response to the movement of the piston toward said respective compression chambers; and means for operating the piston.

In testimony whereof I hereto affix my signature.

WILLIAM A. CHRYST.